No. 635,561. Patented Oct. 24, 1899.
G. B. MALLORY.
GRAIN ELEVATOR.
(Application filed Feb. 20, 1899.)

(No Model.) 10 Sheets—Sheet 2.

WITNESSES:
Gustave Dieterich
John Kehlenbeck

INVENTOR
George B. Mallory
BY
Chas. C. Gill
ATTORNEY.

THE NORRIS PETERS CO., PHOTO-LITHO., WASHINGTON, D. C.

No. 635,561. Patented Oct. 24, 1899.
G. B. MALLORY.
GRAIN ELEVATOR.
(Application filed Feb. 20, 1899.)
(No Model.) 10 Sheets—Sheet 3.

No. 635,561. Patented Oct. 24, 1899.
G. B. MALLORY.
GRAIN ELEVATOR.
(Application filed Feb. 20, 1899.)
(No Model.) 10 Sheets—Sheet 4.

WITNESSES:
Gustave Dieterich.
John Kehlenbeck.

INVENTOR
George B. Mallory
By
Chas. C. Gill
ATTORNEY.

No. 635,561. Patented Oct. 24, 1899.
G. B. MALLORY.
GRAIN ELEVATOR.
(Application filed Feb. 20, 1899.)

(No Model.) 10 Sheets—Sheet 5.

No. 635,561. Patented Oct. 24, 1899.
G. B. MALLORY.
GRAIN ELEVATOR.
(Application filed Feb. 20, 1899.)
(No Model.) 10 Sheets—Sheet 6.

WITNESSES
INVENTOR
George B. Mallory
by
Chas. C. Gill
ATTORNEY.

No. 635,561. Patented Oct. 24, 1899.
G. B. MALLORY.
GRAIN ELEVATOR.
(Application filed Feb. 20, 1899.)
(No Model.) 10 Sheets—Sheet 7.

WITNESSES: INVENTOR
George B. Mallory.
BY
ATTORNEY.

No. 635,561. Patented Oct. 24, 1899.
G. B. MALLORY.
GRAIN ELEVATOR.
(Application filed Feb. 20, 1899.)
(No Model.) 10 Sheets—Sheet 9.

WITNESSES:

INVENTOR
George B. Mallory,
BY
Chas. E. Gill
ATTORNEY

No. 635,561. Patented Oct. 24, 1899.
G. B. MALLORY.
GRAIN ELEVATOR.
(Application filed Feb. 20, 1899.)

(No Model.) 10 Sheets—Sheet 10.

WITNESSES:

INVENTOR
George B. Mallory.
BY
ATTORNEY

UNITED STATES PATENT OFFICE.

GEORGE B. MALLORY, OF NEW YORK, N. Y., ASSIGNOR TO HENRY E. NESMITH, JR., OF SAME PLACE, AND PALMER CAMPBELL, OF HOBOKEN, NEW JERSEY, TRUSTEES.

GRAIN-ELEVATOR.

SPECIFICATION forming part of Letters Patent No. 635,561, dated October 24, 1899.

Application filed February 20, 1899. Serial No. 706,153. (No model.)

*To all whom it may concern:*

Be it known that I, GEORGE B. MALLORY, a citizen of the United States, and a resident of New York, in the county of New York and State of New York, have invented certain new and useful Improvements in Grain-Elevators, of which the following is a specification.

The invention relates to improvements in grain-elevators; and it consists in the novel features and combinations of parts hereinafter described, and particularly pointed out in the claims.

I present the invention in this application as embodied in a floating grain-elevator capable of simultaneously unloading barges or canal-boats arranged at both of its sides and delivering the grain after being weighed and cleaned into the ships by which it is to be transported. The floating elevator presented in this application is provided at both of its sides with a multiplicity of movable sets of unloading apparatus adapted to rapidly unload the canal-boat and barges placed alongside without requiring the shifting of the barges or canal-boats to meet the location of the "legs" of the unloading apparatus. The various sets of unloading apparatus are each of novel construction, and they are mounted upon tracks secured lengthwise of the deck of the floating elevator, so that they may be shifted from place to place upon said tracks as may be desired. In connection with the unloading apparatus I provide along the deck of the floating elevator suitable longitudinal conveyers, which receive the grain from the various unloading apparatus and conduct the same to proper transverse conveyers, whereby it is moved inward to the proper compartments of the floating elevator, whence it is elevated to the weighing-hoppers, thence descending into the proper compartments of the grain-elevator, and thence elevated and delivered through suitable spouts to the ship.

This grain-elevator or "machine," as it may be termed, is intended for great speed and capacity in loading grain into the new North Atlantic steamers trading out of the port of New York. These ships carry mixed cargoes, and all of the grain is taken alongside in canal-boats or barges. Each ship will take from about fifty to one hundred thousand bushels of grain on each voyage. The floating elevators heretofore known are not adapted to the present requirements. In their use a canal-boat or a barge is taken alongside of it, the floater, the single leg (one of which is on each side of the best of the floaters) is lowered into the middle hatch of the boat and as much grain as the captain of the barge will permit is taken out, care being taken by him not to let the boat become strained by the loss of too much weight at this point. The leg is then lifted, the end of the barge brought into proper position, and the leg lowered into the end hatch and all of the grain taken out of this part of the barge. This operation is then performed as to the other end of the barge and then as to the center or middle hatch, which ends the unloading operation. By the three operations of moving the barge fully one-third of the total time for unloading the barge has been consumed. Often when the barge is moved ahead, so that the leg on the floater can reach the end hatch, some lighter will follow in and obstruct the return of the barge to its desired position, thus causing further delay. The floater unloading a single barge or a barge on each side must have room to move the barges in equal to twice their length, whereas with the floater made the subject of this application twice the number of barges may be handled, since they are not moved during the unloading operation.

The drawings illustrate the floating elevator engaged in simultaneously unloading from one barge and two canal-boats and delivering the grain into the steamship, and this is a result which I believe has never heretofore been attained by any grain-elevator.

In the drawings I illustrate the unloading apparatus at both sides of the floating elevator; but I do not limit the invention to the employment of the apparatus at both sides of the elevator, since the invention would be present if the apparatus were only used at one side of the elevator.

The nature of the invention and suitable means for carrying the same into effect will be fully understood from the detailed description hereinafter presented, reference being had to the accompanying drawings, in which—

Figure 1:
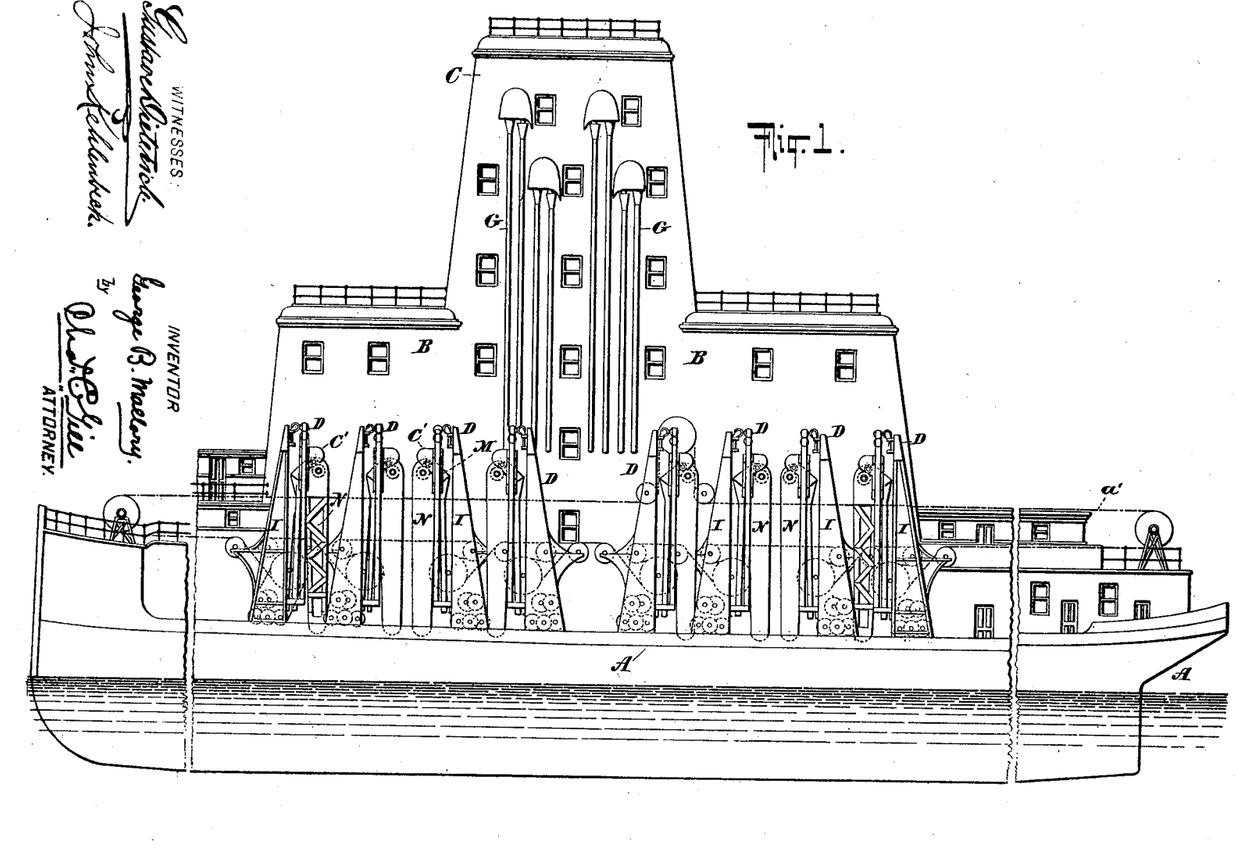
Figure 1 is a side elevation of a floating elevator equipped with the mechanism constructed in accordance with and embodying the invention.
Figure 2:
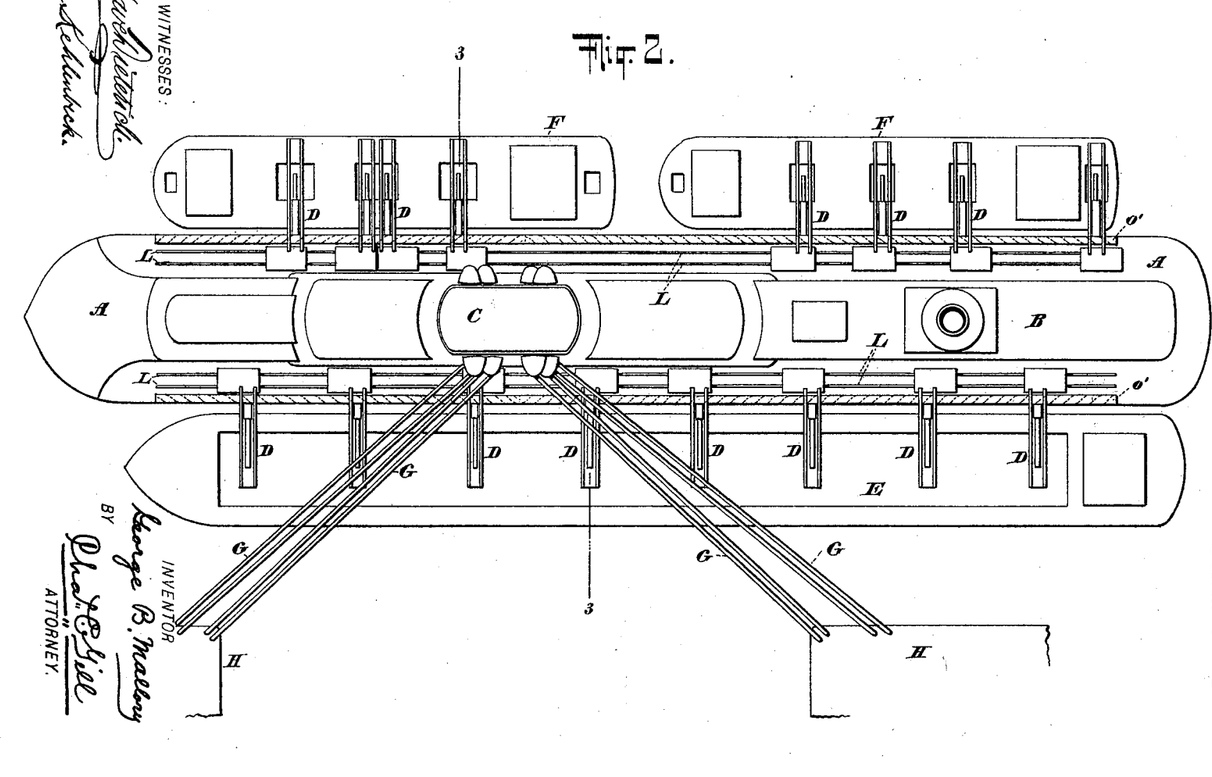
Fig. 2 is a top view of the same and illustrating the apparatus in the operation of unloading two canal-boats and one railway-barge and transmitting the grain into the hatchways of a ship.
Figure 3:
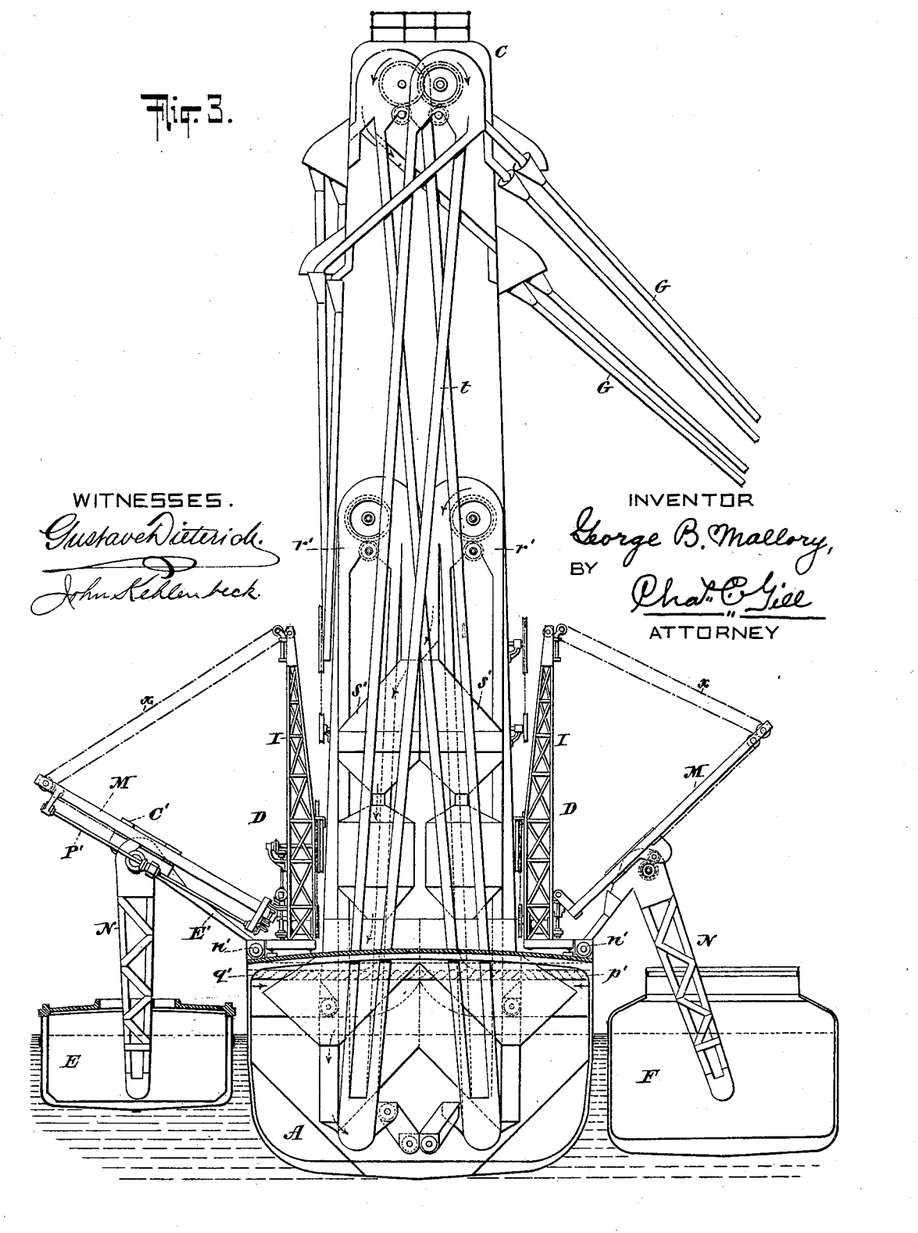
Fig. 3 is a vertical transverse section of same on the dotted line 3 3 of Fig. 2.

In the drawings, referring to Figs. 1, 2, and 3, A designates the floating grain-elevator; B, the house thereon; C, the usual tower, and D the unloading apparatus, mounted upon the deck of the floating elevator and duplicated at opposite sides of the elevator to as great an extent as may be desired. In the present instance, referring more particularly to Figs. 1 and 2, I illustrate eight different and distinct sets of the unloading apparatus D at each side of the floating elevator A, and in Fig. 1 the eight sets of unloading apparatus D are illustrated in their normal inoperative position, while in Fig. 2 the various sets of unloading apparatus D are illustrated in their operative position, the eight sets of unloading apparatus D, located at one side of the elevator A, being illustrated in the operation of unloading a barge E and the eight sets of unloading apparatus D at the other side of the elevator A being represented in the operation of unloading two canal-boats F F. All of the sixteen sets of unloading apparatus D may be put into simultaneous operation, or, if preferred or the necessities of the case should require, only a portion of said sixteen sets of unloading apparatus D may be put into use. The grain unloaded from the canal-boats or barge or other containing-receptacle and received into the elevator A may be discharged by means of usual spouts G into the hatchways H of a ship alongside of the barge E, as indicated in Fig. 2.

The unloading apparatus D, (whether one set or more may be employed,) with its cooperate parts, constitutes an essential portion of the invention sought to be protected by this application, and hence in Figs. 1, 2, and 3 this apparatus is illustrated in its inoperative and in its operative positions, while in Figs. 5, 6, 7, 8, 9, and 10 one set of the unloading apparatus D is illustrated on an enlarged scale.

In order that the invention may be fully understood, I will now describe in detail one set of the unloading apparatus D, and it is to be understood that the several sets of unloading apparatus D are duplicates of one another and are mounted upon suitable tracks secured to the deck of the boat.

Figure 5:
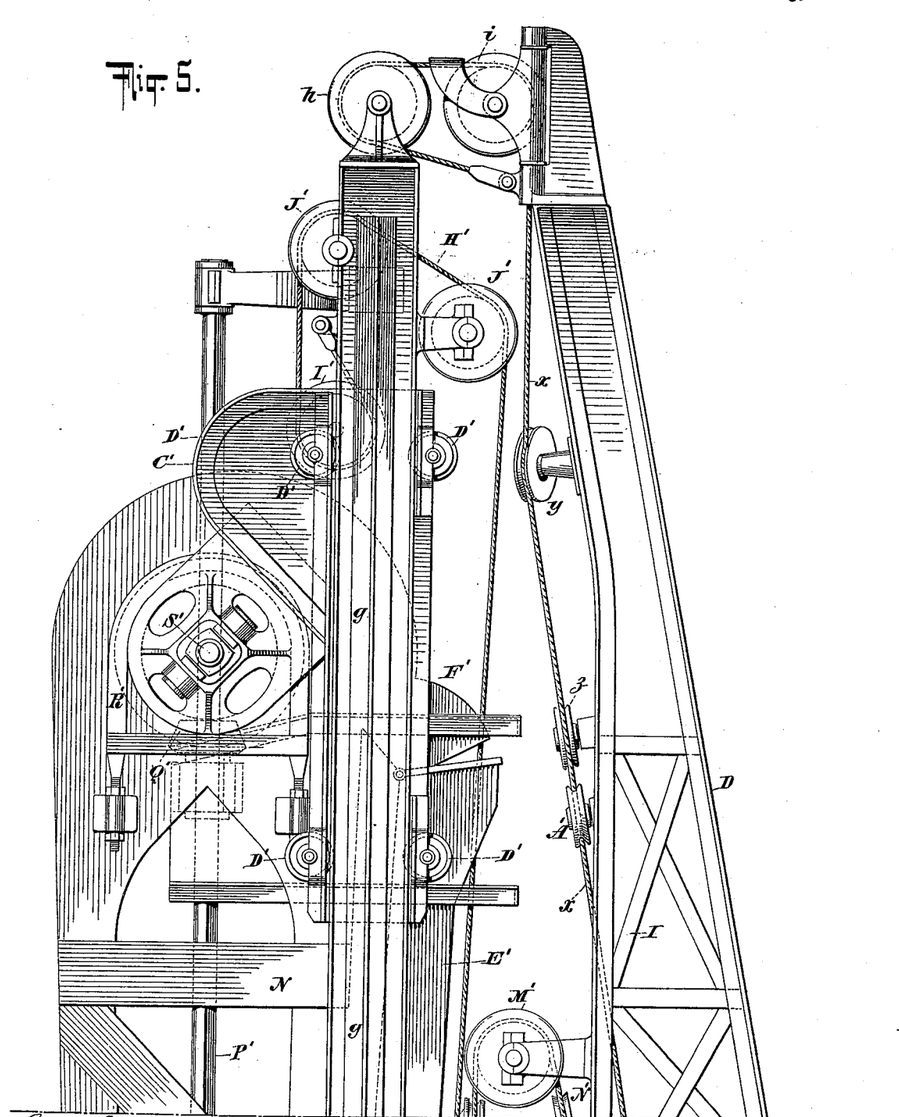
Figs. 5, 6, and 7 represent an enlarged side elevation of the same, the three figures being on separate sheets and when brought together one under another presenting a complete side elevation of the unloading apparatus, the apparatus in these figures being shown in its normal inoperative position and mounted upon suitable tracks arranged upon the deck of the floating elevator.
Figure 6:
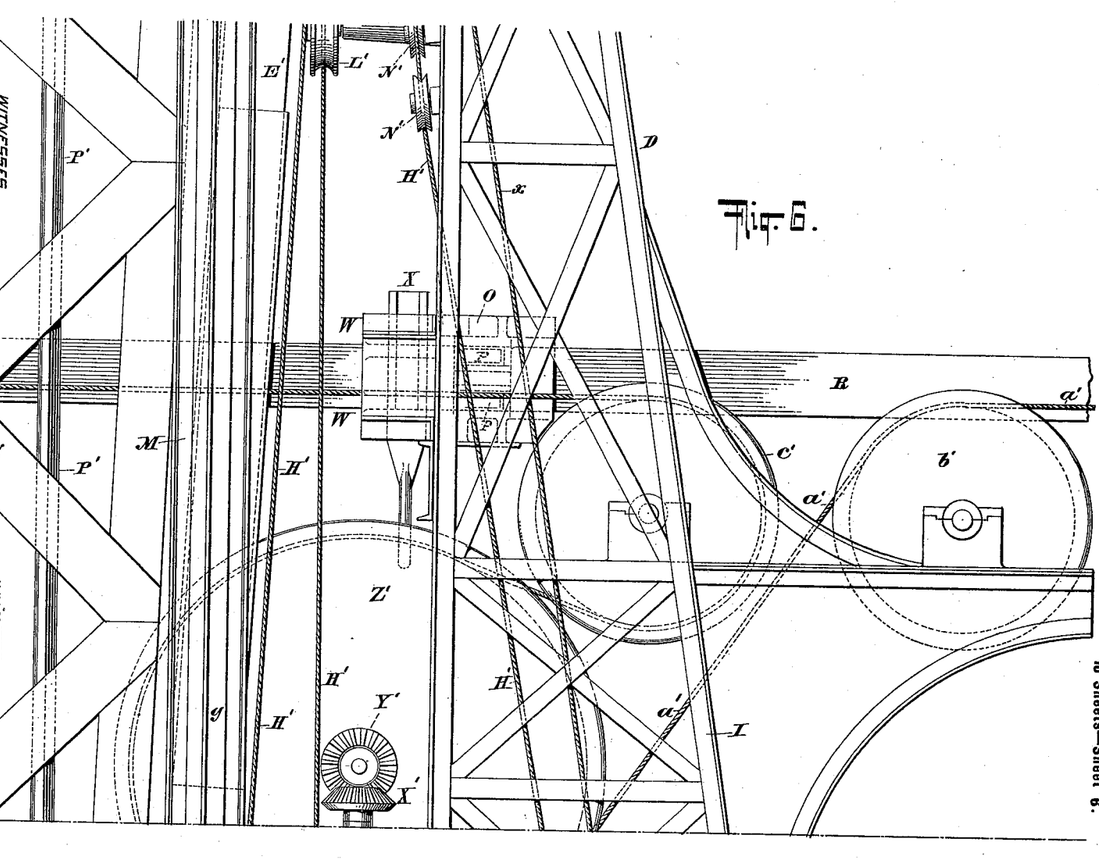
Figure 7:
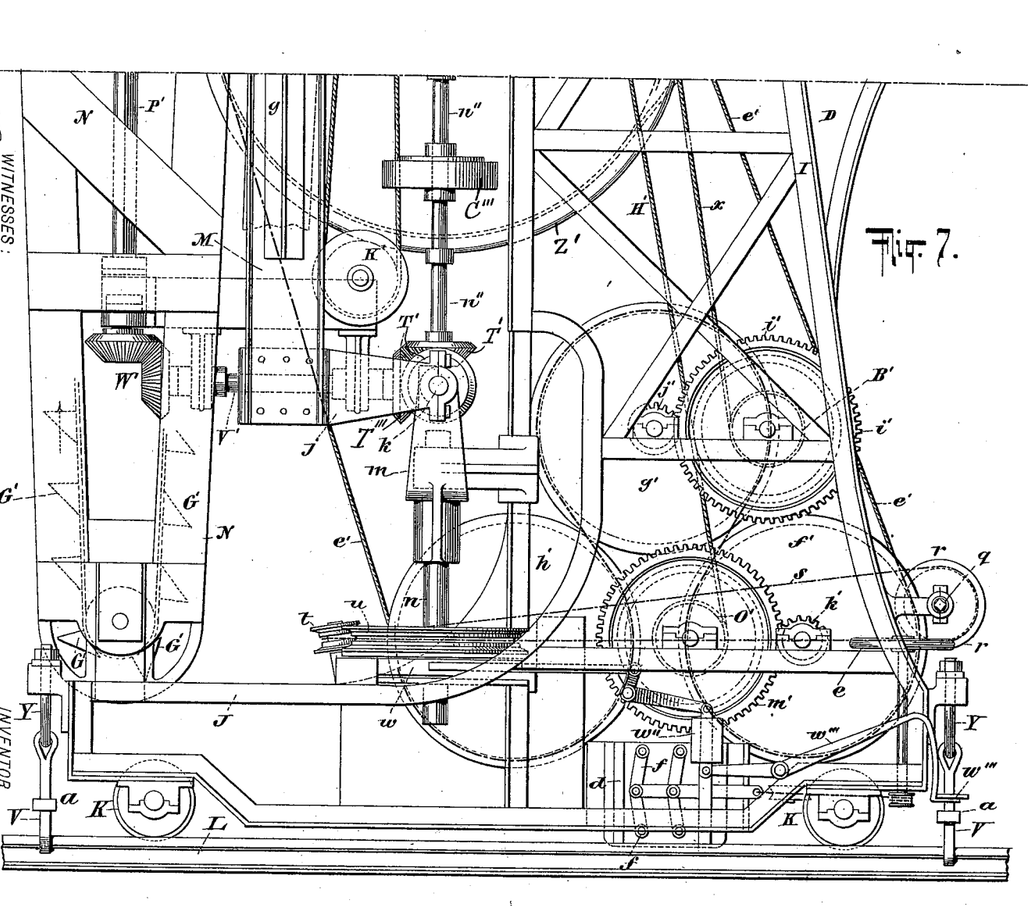
Figure 8:
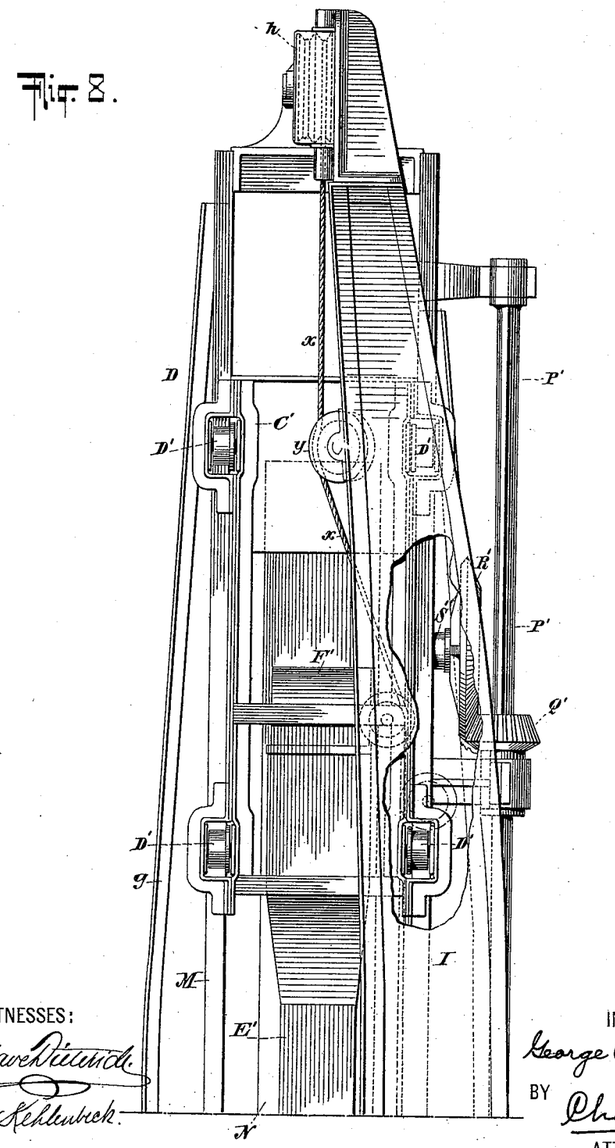
Figs. 8, 9, and 10 illustrate when arranged one below the other an end view of the same, the three figures being on separate sheets, as in the case of Figs. 5, 6, and 7.
Figure 9:
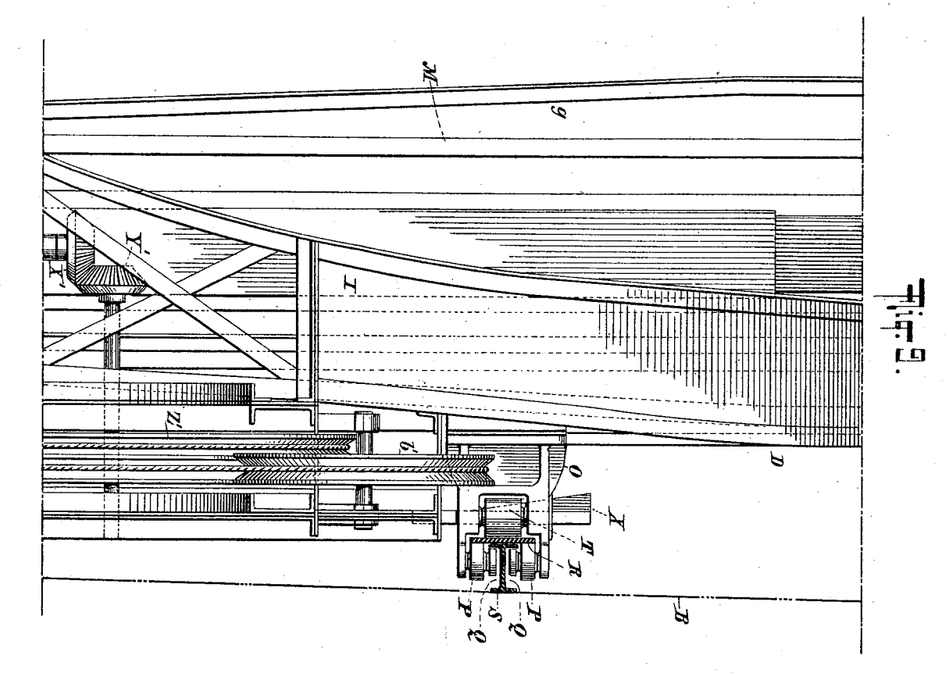

Each set of the unloading apparatus D comprises the vertical frame I, whose lower portion terminates in a carriage J, carrying the flanged wheels K, by which the carriage, the frame I, and the parts connected therewith and carried thereby may be moved or shifted to the desired position for operation upon the rails L, secured to the deck. The frame I and carriage J are adapted to have simply a direct traveling motion upon the rails L; but the boom M and the unloading-leg N, which are carried by said frame I, are adapted to have a swiveling or axial motion, as hereinafter described, from the vertical shaft $n$, whereby said boom M and leg N may be moved from their normal inoperative stowed or closed position over the carriage J, as shown in Figs. 5, 6, and 7, to their outer operative position. (Illustrated in Fig. 3.) The boom M and unloading-leg N are compactly housed above the carriage J when said parts are in their inoperative position, (shown in Figs. 5, 6, and 7;) but when it is desired to put the apparatus into operation the boom M and leg N are by suitable means hereinafter described turned axially in a direction at right angles to the longitudinal center of the carriage J, in order that upon the slackening of the cables retaining the upper ends of said boom and leg the said boom and leg may move outward beyond the side of the floating elevator A and attain the operative position. (Illustrated in Fig. 3.)

In the description of the one set of unloading apparatus D it will be necessary to refer to various gears, pulleys, chains, and cables employed in handling the various parts of the apparatus; but the present invention is not limited to the said operating means nor to the special arrangement thereof illustrated.

Figure 4:
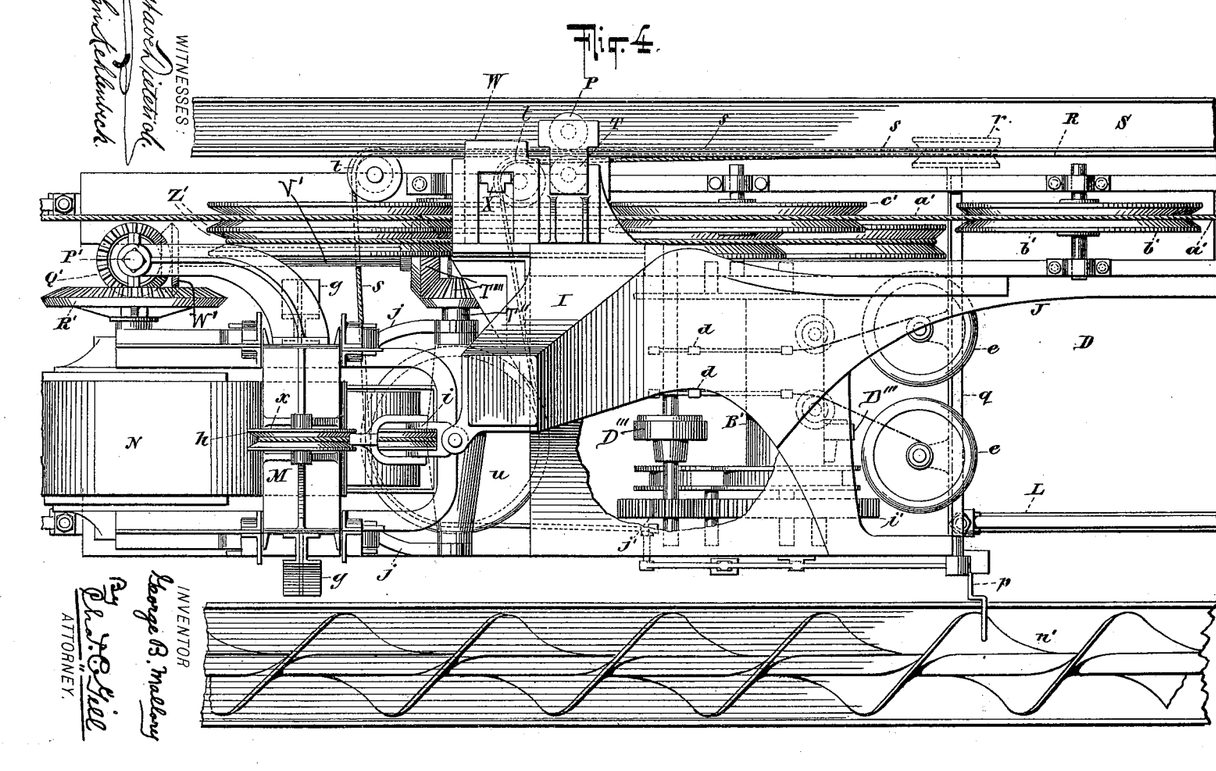
Fig. 4 is an enlarged top view, partly broken away, of one set of the unloading apparatus mounted upon the deck of the floating elevator.

The frame I and carriage J will preferably be constructed of steel and may be in the form of lattice-girders, as shown in Figs. 5, 6, and 7, or, if preferred, may be constructed of rolled plate-steel, in accordance with the size of the apparatus and the strength or stiffness of said frame required. The frame I extends upward to a proper height governed by the length of boom and unloading-leg required. Owing to the height of the frame I and the weight it is necessary for said frame to support, the said frame will be provided with means whereby it may be held at a suitable point above its lower portion against the side of the house B, and thus in Figs. 6 and 9 it will be seen that upon the frame I is secured a casting O, which at its right-hand end, looking at Fig. 6, carries the rollers P Q, (see Fig. 9,) which rollers respectively engage the upper and lower surfaces at the inner side of the plate R, secured to the I-beam S and the inner side of the outer flange of said I-beam S. The I-beam S is rigidly secured to the side of the house B, and the plate R is secured to said I-beam S, and hence the I-beam S and plate R form a flanged guide and tramway for the rollers carried by the casting O, as well as affording a stay by which the frame I is held in its upright position. The casting O also carries the roller T, (shown in Fig. 9,) which is in properly near relation to the outer face of the plate R. Thus the roller T during the travel of the carriage J will move along the outer face of the plate R, the rollers P will move along the inner face of the plate R, and the rollers Q will travel along the inner face of the outer flange of the I-beam S. When the rollers P, Q, and T are in the relation illustrated in Fig. 9 to the plate R and I-beam S, it will be seen that they will, in conjunction with said I-beam, retain the frame in its vertical position and at the same time permit said frame to be shifted from place to place by the movement of the carriage J on the track-rails L, the latter and the I-beam S being longitudinally disposed. After the frame I has been shifted to its desired position, either for operation or for the purpose of being housed, it is frequently desirable to lock the said frame I in its then attained position, and this result I accomplish by means of the clamps V, secured to the corners of the carriage J and engaging the track-rails, and also by means of the clamps W, which are located at the upper and lower portions of the casting O to the left of the rollers P Q, and which clamps have their edges lapping over upon the edges of the plate R, secured to the I-beam S, as shown in Fig. 4, and are adapted to be tightly clamped against the edges of said plate R by the driving downward of the wedge X, which, when driven downward, will so firmly bind the engaging lips of the clamps W against the said plate R that the frame I will be immovably secured in position. The clamps V, engaging the track-rails, may be fully understood by reference to Figs. 7 and 10, in which it will be seen that said clamps V are supported by adjustable eyebolts Y and are each formed of two arms Z Z, adapted to pass below the head of the track-rails L and be there securely locked by means of the sliding bands $a$, which, when moved downward, will close the arms Z Z against the track-rails and when moved upward will permit said arms Z Z to free themselve from said track-rails. The clamps V not only aid in holding the carriage J against longitudinal movement, but also in preventing the frame I from having any tilting movement due to the weight or the position of the parts it supports.

The carriage J, supporting the frame I and the other parts of the unloading apparatus, will be shifted from place to place by means of the cable $b$ (shown in Fig. 10) and any suitable grip mechanism connected with the carriage J for engaging this cable $b$. The cable $b$ will extend longitudinally of the deck and be operated from the usual engines or other power mechanism supplied to the floating elevator. The invention is not limited to any special grip connected with the carriage J for connecting the carriage with the cable $b$; but in the drawings I have indicated a grip (lettered $d$) for this purpose, and this grip will be operated in a well-known manner by means of hand-wheels $e$, (shown in Figs. 7 and 10,) whose motion will either apply or release the grip $d$ from the cable $b$. As illustrated in Fig. 7, the rotation of the hand-wheel $e$ in one direction will actuate the toggle-levers $f$ to apply the grip, and the motion of said hand-wheel $e$ in the opposite direction will release the grip. Any suitable well-known grip mechanism may be employed on the carriage J, and since this invention is not limited to any special grip mechanism for grasping the cable $b$ it will be unnecessary to either show or describe in detail the grip mechanism. By means of the grip $d$ and cable $b$ the carriage J and the parts supported thereby may be conveniently shifted along the track-rails L, so as to bring the apparatus into proper operative location with respect to the canal-boat or barge to be unloaded and thereafter returned to its original housed location or to some other location for use.

The boom M is illustrated in side elevation in Figs. 5, 6, and 7, and it consists of two separated corresponding channel-beams connected together at their upper and lower ends and strengthened upon the face of the sides with the angle-irons $g$. (Illustrated in Figs. 4 to 9.) The upper end of the boom M carries the pulley-wheel $h$, corresponding with a pulley-wheel $i$, swiveled to the upper end of the frame I, and the lower end of the boom M is supported by the yoke $j$, whose inner ends or arms are mounted upon trunnions $k$, carried by the frame $m$, which is rigidly mounted upon the vertical shaft $n$, the latter being adapted to revolve and being stepped in the upper portion of the carriage J. The leg N is carried by the boom M and, as hereinafter described, is adapted to have a sliding movement upon said boom. The axial rotation of the shaft $n$ is utilized to turn the boom M and leg N laterally, so as to enable said leg to reach over the side of the floating elevator. The axial rotation of the shaft $n$ is accomplished by means of power applied through a crank $p$ (see Figs. 4 and 10) to the shaft $q$, (see Figs. 7 and 10,) which carries a wheel $r$, from which a cable or chain $s$ passes around the intermediate pulleys $t\, t$ (see Fig. 4) and around the main wheel $u$, (see Figs. 4 and 7,) connected with the shaft $n$. The motion imparted to the chain or cable $s$ from the crank $p$ and shaft $q$ will operate through the wheel $u$ to turn the shaft axially, so as to move the boom M and leg N outward laterally and at the proper time to return said boom M and leg N to their former position over the carriage J. The chain or cable $s$ and the wheels over which the same moves simply represent one mechanical means for imparting an axial motion to the shaft $n$, and the invention is not, of course, limited to any special means for imparting this motion to the shaft $n$. A suitable friction-brake $w$ should be applied to the wheel $u$ and should be kept in engagement with said wheel automatically, as by a weight $w''$, Fig. 7, except when purposely released from said wheel, as by a treadle-lever $w'''$. When the shaft $n$ is turned so as to move the boom M and leg N outward laterally, provision is then made for allowing the upper end of the boom to swing outward from over the carriage J in order that the leg N may descend into the hold of the vessel to be unloaded, and this is accomplished by the slackening of the cable $x$, which at its upper end is, as shown in Fig. 5, fastened to the upper end of the frame I, and thence passes around the pulley $h$, secured to the upper end of the boom, and the swiveling pulley $i$, carried at the upper end of the frame I, and thence passes downward, over the pulleys $y$, $z$, and A', to the winch B', mounted between the sides of the lower end or portion of the frame I. By paying out the cable $x$ from the winch B' the upper end of the boom M will be permitted to swing outward beyond the vertical plane of the side of the floating elevator to as great an extent as may be desired or occasion render necessary, and during this outward movement of the upper end of the boom M said boom has substantially a hinge-like movement upon the trunnions $k$, receiving the inner end or arms of the yoke $j$.

The unloading-leg N contains an endless belt of traveling buckets, of usual construction, and at its lower end this leg is open, as indicated in Fig. 7, to receive the grain which it may be desired to unload from the barge or canal-boat. The upper end of the leg N is hinged between the opposite sides of a carriage C', which passes between the opposite sides of the boom M and is furnished with wheels D', which engage the flanges of the sides of the said boom and travel thereon as upon a tramway. The carriage C' is adapted to be moved downward and upward upon the boom M and carries the leg with it. The leg N carries at its upper inner portion the hinged discharge-spout E', through which the grain elevated by the leg N is caused to pass into the conveying-worms or other conveying apparatus, as hereinafter described, located upon the deck of the boat to receive the grain from the unloading apparatus and convey it to the proper part of the floating elevator. Adjacent to the upper end of the discharge-spout E' the upper inner portion of the leg N is provided with a hood F', (see Fig. 5,) upon which the upper end of the spout E' passes when the leg N extends outward toward a vertical position into the hold of the vessel to be unloaded, thus forming a continuous closed discharge for the grain from the upper portion of the leg N to the floating elevator. The discharge-spout E' is otherwise than as above explained of ordinary construction and when in its normal inoperative position simply hangs downward between the sides of the boom M, as illustrated in Figs. 5, 6, and 7.

I provide means for raising and lowering the carriage C' with the leg N and discharge-spout E', and I also provide means for effecting the movement of the traveling belt of buckets G', located within the leg N. I will first describe the means for raising and lowering the carriage C', with the parts carried thereby, and said means comprises the cable H', which at its upper end is fastened to the side of the boom M, and thence passes over the wheel I', mounted on the carriage C', thence over the wheels J' J', mounted upon the boom M, as shown in Fig. 5, thence passes downward along the inner side of said boom and over the pulley-wheel K', adjacent to the lower end thereof, thence passes upward over the pulley-wheel L', carried by the frame I, thence over the pulley-wheel M', also carried by said frame I, thence downward over the pulley-wheels N' N', also carried by said frame I, (see Figs. 5, 6, and 7,) thence downward to the winch O', mounted upon the sides of the frame I, adjacent to the upper portion of the carriage J. Upon the paying out of the cable H' from the winch O' the weight of the carriage C' will cause it to ride downward upon the boom M in proportion to the extent to which the cable H' is paid out. The reverse motion of the winch O' will result in the cable H' being pulled in and wound upon the winch, and this will have the effect of causing the carriage C' to ride upward upon the boom M to the position in which said carriage is illustrated in Fig. 5, this being its upper position. When the boom M is permitted to swing outward over the side of the floating elevator to the inclined position in which it is illustrated in Fig. 3, the carriage C' will ride down the boom upon the slackening of the cable H', and the leg N, having a hinged movement, will automatically swing to its substantially vertical position and enter the hold of the vessel to be unloaded; and when by means of the cable $x$ the upper end of the boom M is pulled upward to its normal inoperative position over the carriage J and by means of the cable H' the carriage C' is drawn to its upper position upon said boom, as shown in Fig. 5, the leg N will automatically swing inward to position alongside the boom, as illustrated in Figs. 5, 6, and 7.

It is necessary that means be provided for actuating the endless belt of elevating-buckets G', located within the leg N, while said leg is in the various positions it may be necessary for the same to assume, due to the position of the carriage C' and the conditions of the vessel to be unloaded, and these means will now be described.

The endless chain of buckets G' is, as usual, mounted upon wheels at the lower and upper ends of the leg N, and the upper one of these wheels imparts the traveling motion to the said endless belt of buckets G', and it receives its motion from the vertical shaft P' (shown in Figs. 5, 6, 7, and 8) through the medium of the beveled pinion-wheel Q' on said shaft and the beveled gear-wheel R', mounted upon the shaft S' of said belt-wheel, within the upper end of said leg N. The shaft P' is rectangular in cross-section and passes through a corresponding aperture in the beveled pinion-wheel Q', and hence the axial rotation of the said shaft P' is communicated to the gear-wheels Q' R' and by the latter to the endless belt of buckets G'. The shaft P' is carried by the boom M and remains parallel with said boom when the latter is inclined outward over the side of the floating elevator, as illustrated in Fig. 3. The shaft P' passes freely through the gear-wheel Q', and the latter is secured to the carriage C', and hence when the carriage C' rides upward or downward upon the boom M the gear-wheel Q' will follow the same and remain in mesh with the gear-wheel R'. The shaft P' receives its motion from the vertical shaft $n''$ through the pair of intermeshing bevel gear-wheels T', (see Fig. 7,) one of which is secured on said shaft $n''$, the horizonal shaft T'' (see Figs. 4 and 10) carrying at one end the other of said gear-wheels T', the pair of intermeshing bevel gear-wheels T''', (shown in Figs. 4 and 10,) and one of which is carried by said shaft T'', the shaft V' (see Figs. 4 and 7) carrying at one end one of said gear-wheels T''', and the pair of intermeshing bevel gear-wheels W', Fig. 7, one of which is on said shaft V' and the other directly on the lower end of said shaft P'. The means for communicating motion to the vertical shaft $n''$ for the purpose of revolving the shaft P' comprise the beveled gear-wheels X', (see Fig. 6,) the horizontal shaft Y', and the pulley-wheel Z', and this pulley-wheel Z' receives its motion from the endless cable $a'$, which is actuated from the engines of the floating elevator and, as shown in Fig. 1, travels lengthwise alongside of the house B and is adapted to actuate all of the unloading apparatus D. Referring more pacticularly to the single apparatus illustrated in Figs. 5, 6, and 7, it will be seen that the lower reach of the cable $a'$ passes over the wheel $b'$, thence downward over the lower side of the pulley-wheel Z', thence upward around said wheel Z' and around the lower side of the wheel $c'$, and thence along the top of the said wheel $c'$ to the wheels of the adjacent unloading apparatus D. The operation of the cable $a'$, passing over the wheels $b'$ Z' $c'$, is to revolve said wheel Z' and the shaft Y', upon which it is mounted, and the result of the rotation of the shaft Y' is through the beveled gear-wheels X' to impart motion to the vertical shaft $n''$, and thence through the beveled gear-wheels T', shaft T'', bevel gear-wheels T''', shaft V', and beveled gear-wheels W' to the shaft P'. Thus the cable $a'$ is utilized through the intermediate gearing to effect the constant traveling motion of the endless belt of buckets G' for all of the several unloading apparatus D with which it may be connected. The sliding motion of the carriage C' and leg N does not interfere with the motion of the shaft P', since the latter is carried by the boom M, and the beveled gear-wheels Q' and P' remain in mesh and receive their motion from the shaft P' without regard to the special location of said carriage C' and said leg N with respect to the boom M.

Figure 10:
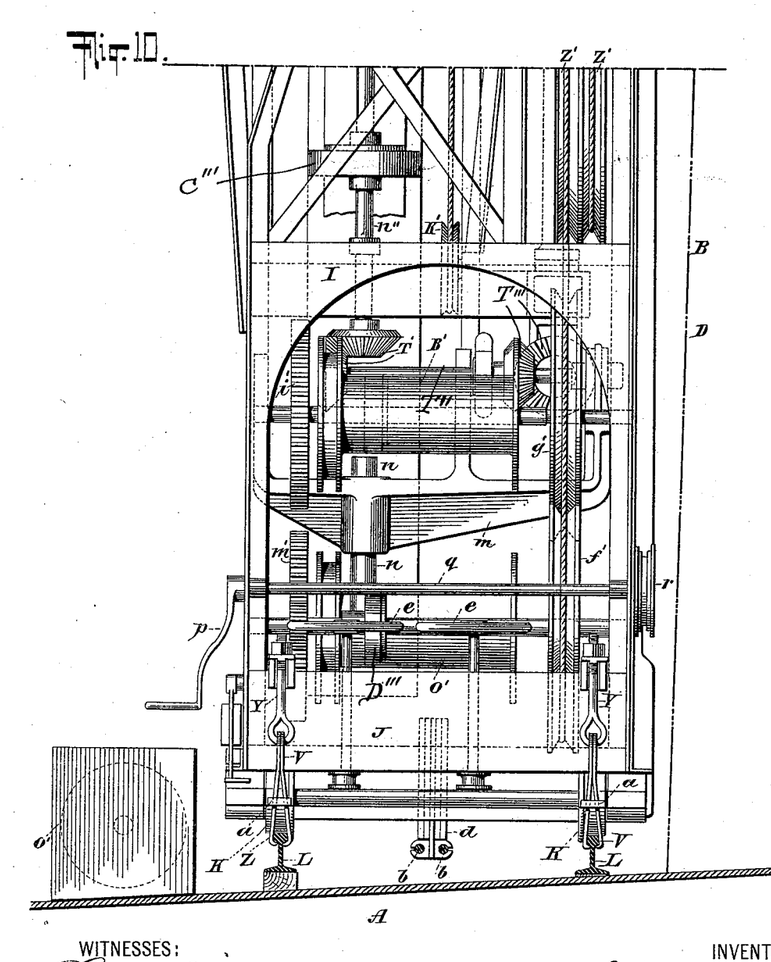

Since it may be desired at times to operate the elevating-buckets G' of some of the apparatus D and not those of the other apparatus D by means of the continuously-traveling cable $a'$, it is desirable that the shaft $n''$ be made in two sections connected by a customary form of friction-clutch C''', Figs. 7 and 10, in a well-known manner, whereby when desired the motion of the upper section of the shaft $n''$ may be cut off from the lower section of said shaft $n''$ and the gearing leading therefrom to the buckets G'. The friction-clutch C''' is of the ordinary character, and it is only employed as a means of cutting out one or more of the belts of buckets G' without interfering with the operation of the other belts of buckets G' or with the continuous travel of the cable $a'$.

The motion imparted from the cable $a'$ through the wheel Z' to the shaft Y' is not only utilized to operate the endless belt of buckets G', but is also utilized as a means for operating the winches B' and O', whereby, through the cables $x$ and H', respectively, the boom M and carriage C' are controlled as to their movements, and this result is accomplished by reason of the fact that the said wheel Z' is provided with a second groove, in which passes the chain or cable $e'$, (see Fig. 7,) which is directly utilized to convey motion from said wheel Z' to the means more directly connected with said winches B' O'. Upon reference to Figs. 6 and 7 it will be seen that the cable or chain $e'$ passes downward around the wheel $f'$, then upward and around the wheel $g'$, and thence downward and around the corresponding wheel $h'$, whence said cable or chain $e'$ passes upward to the wheel Z'. The cable or chain $e'$ is endless. Upon the end of the winch B' is provided the gear-wheel $i'$, and this gear-wheel is engaged by the pinion-wheel $j'$, secured upon the shaft of the wheel $g'$, and thus when the wheel $g'$ is actuated its motion will be imparted through the pinion-wheel $j'$ and gear-wheel $i'$ to the winch B', and thus said winch when turned in one direction will pay out the cable $x$ and allow the boom M to swing outward, and when said winch B' is turned in the opposite direction it will wind in said cable and pull said boom M to its upright position. Upon the shaft of the wheel $f'$ is secured the pinion-wheel $k'$, and this pinion-wheel is in mesh with the gear-wheel $m'$, secured to the end of the winch O', and hence when the wheel $f'$ is revolved its motion will be communicated through said pinion-wheel $k'$ and gear-wheel $m'$ to the winch O', and thus the cable H' will be paid out or drawn in in accordance with the direction of motion imparted to said winch O'. When the winch O' pays out the cable H', the carriage C' will be permitted to ride down upon the boom M, and the leg N may descend to the vessel to be unloaded. When the cable H' is drawn in by being wound upon the winch O', the carriage C' will be drawn to its upward position upon the boom M, and the leg N will follow said carriage. The cable or chain $e'$ is thus enabled to control and operate both the boom M and the carriage C', carrying the leg N, and in view of the construction presented the cable or chain $e'$ is rendered capable of simultaneously operating the boom M and carriage C'.

The cable or chain $e'$ has a continuous motion, and hence it is necessary that means be provided for cutting off the power of said cable or chain $e'$, when desired, from the winches B' and O'. These cutting-off means may be of any of the various kinds known to mechanics, and I suggest the employment of ordinary friction-clutches D''', Fig. 4, in the shafts of the gear-wheels $j'$ and $k'$, so that except when desired the revoluble motion of the cable-wheels $f'$ and $g'$ may not be imparted to the said gear-wheels, and consequently not to the said winches.

The operation of the various features comprising the apparatus hereinbefore described has been pointed out in connection with the description of said features and probably will be fully understood without further detailed description. Each unloading apparatus D is carried by and supported upon a carriage J, and the frame I is rigid with said carriage. The boom M is pivotally supported at its lower end, so that it may be turned axially as well as have a hinge-like movement, so as to swing outward over the side of the floating elevator. The boom M serves as a tramway for the carriage C', to which the leg N is connected. Proper gearing and rigging are shown and have been hereinbefore described, whereby the upper end of the boom may be turned outward over the side of the floating elevator to any angle desired, and whereby also the carriage C' may be lowered to any required position along said boom. Means have also been described whereby the boom may be turned axially, so as to cause the leg N to pass over the side of the floating elevator and enter the barge, canal-boat, or other vessel to be unloaded, and the same means may be utilized for turning the boom M in a reverse direction, so that it shall reach its normal housed or stowed position above the carriage J, as shown in Figs. 5, 6, and 7. I have also described means for moving the carriage J and the parts carried thereby lengthwise over the deck of the elevator and for locking said carriage in position upon said rails. The frame I has also, as above described, been provided with means for coöperating with the beam S and plate R in a manner which enables said beam and plate to operate both as a guide and as a stay. When the leg N has been swung to the position illustrated in Figs. 2 and 3 and the shaft P' set in motion, the endless belt of buckets G' will in a well-known manner elevate the grain and deliver it to the downwardly-inclined discharge-spout E', and hence it remains to be described what becomes of the grain delivered from said discharge-spout E'.

In view of the fact that the unloading apparatus D may be shifted from place to place along the deck it is necessary to provide conveying means for removing the grain delivered by the spout E' to the proper compartments of the elevator, and to this end I provide along each side of the deck the spiral conveyers $n'$, which are on said deck and are inclosed at their other sides by means of boxes $o'$, running fore and aft, as indicated in Figs. 2, 3, and 10. The grain from the various discharge-spouts E' will enter the boxes $o'$ and be moved by the spiral conveyers $n'$ to a suitable point, where similar transverse spiral conveyers $p'$ $q'$ will take the grain and convey it inward to the proper compartments within the floating elevator. The transverse spiral conveyers $p'$ (see Fig. 3) will carry the grain from the longitudinal conveyer $n'$ toward the left to the opposite side of the floating elevator, and likewise the transverse conveyer $q'$ will take the grain from the adjacent spiral conveyer $n'$ and move the grain inward toward the right. Thus looking at Fig. 3 the transverse conveyer $p'$ will receive the grain from the right-hand longitudinal conveyer $n'$ and convey the same to the left-hand side of the vessel and the transverse conveyer $q'$ will receive the grain at its left-hand end and move the same across to the right-hand side of the boat, the delivery of the grain thus properly balancing the boat. The grain leaving the various spouts E' and conveyed inward by the longitudinal conveyers $n'$ and transverse conveyers $p'$ $q'$ will enter suitable hoppers provided within the interior of the floating elevator and thence be carried upward through elevating-legs $r'$, whence it will descend through the weighing-hoppers $s'$ (see Fig. 3) to other suitably-arranged compartments in the interior of the floating elevator, from which latter compartments the weighed and cleaned grain will be carried upward through suitable elevating-legs $t'$ of well-known form and reach the discharge-spouts G, leading to the hatchways of the steamship or other vessel to be loaded with the grain, as shown in Fig. 2.

The bins or compartments within the interior of the floating elevator will vary according to judgment and other circumstances, and the present invention is not limited to any special arrangement of these bins or compartments, nor is this invention limited to the elevating-legs r' and t' nor to the discharge-spouts G, since said legs r' t' and spouts G are features common to floating grain-elevators.

The invention is not limited to details of form or construction nor to the endless belt of buckets G' for elevating the grain nor to any special means for elevating the grain, and in the combinations comprising the conveyer or conveyers the invention is not, except as otherwise expressed in the claims, limited to the special construction shown of the elevating or unloading apparatus nor to conveyers of the special type illustrated.

In the claims, referring to the conveyers, I desire it to be understood that except as otherwise expressed any kind of a movable grain-elevating apparatus coöperating with and discharging into the conveyer or conveyers may be used and are included therein.

What I claim as my invention, and desire to secure by Letters Patent, is—

1. The grain-elevator having along and upon its deck the longitudinal grain-conveyer, combined with the grain-unloading apparatus mounted upon said floating elevator and comprising the supporting-frame, the hinged boom, the leg carried thereby for entrance into the vessel to be unloaded, and the discharge-spout carried at the upper end of said leg and adapted upon the lowering of said leg to be placed into communication with the said longitudinal conveyer, whereby the grain elevated by said leg may be delivered to said conveyer and by the latter be transferred to the proper portion of the floating elevator for its further manipulation; substantially as set forth.

2. The elevator having along and upon its deck the longitudinal conveyer, and the conveyer leading therefrom inward to the hold of the vessel, combined with the several sets of grain-unloading apparatus mounted upon said deck at the various points corresponding with the hatches of the boat to be unloaded, and each of said apparatus comprising the supporting-frame, the hinged boom, the hinged leg carried thereby and adapted to be lowered into the hatch of the boat to be unloaded, and the discharge-spout carried at the upper end of said leg, the discharge-spouts of all of said apparatus being adapted, when the legs are lowered into the hatches of the boat to be unloaded, to be placed into communication with said longitudinal conveyer, whereby the grain from the various hatches of the one or more boats to be unloaded, may be elevated by said legs and delivered by said discharge-spouts to the said conveyer which removes the same to the proper portion of the floating elevator for further manipulation, thus permitting all of the said legs to have a simultaneous operation; substantially as set forth.

3. The grain-elevator having along its deck the track-rails, and the grain-unloading apparatus mounted upon said track-rails and comprising the carriage, the supporting-frame carried thereby, the boom hinged at its lower end upon said carriage, the leg connected at its upper end to said boom and adapted to be lowered into the hatch of the boat to be unloaded and the discharge-spout connected with the upper end of said leg, combined with means carried by said carriage for raising and lowering said boom and said leg, means for moving said unloading apparatus along said track-rails in accordance with the position of the hatch of the boat to be unloaded, and means for locking said carriage in position; substantially as set forth.

4. The floating grain-elevator having along and upon its deck the longitudinal grain-conveyer and the longitudinally-arranged track-rails, and the several sets of unloading apparatus mounted upon said track-rails, and each comprising the carriage, the frame supported thereby, the boom hinged at its lower end upon said carriage, the leg carried at its upper end by said boom, and the discharge-spout carried at the upper end of said leg, combined with means for moving all or any of said unloading apparatus along said track-rails in accordance with the position of the hatches of the boat to be unloaded, means for locking said carriages in position upon said track-rails, and means carried by said carriages for elevating and lowering said boom and said leg, all of said discharge-spouts being adapted to be placed into communication with the said longitudinal conveyer, whereby all of said legs may have a simultaneous operation and the grain be moved along to the proper portion of the grain-elevator for its further manipulation; substantially as set forth.

5. The floating elevator having along its deck the conveyer, along the side of its house the guide and stay, and along its deck the track-rails, combined with the unloading apparatus mounted upon said track-rails and connected to said guide and stay and comprising the supporting-frame, the boom, the leg, and the discharge-spout leading from the upper end of the leg to said conveyer; substantially as set forth.

6. The floating elevator having along its deck the conveyer, along the side of the house the guide and stay, and along its deck the track-rails, combined with the unloading apparatus mounted upon said track-rails and comprising the supporting-frame held by said guide and stay, the boom supported by said frame, the leg supported by said boom, and the discharge-spout leading from the upper end of said boom to said conveyer, said guide and stay being adapted to guide said frame in its movement upon said track-rails and affording means for locking said frame in stationary position after the unloading apparatus has reached its desired position; substantially as set forth.

7. The floating elevator having along its deck at opposite sides of the house the track-rails and conveyers, combined with the several sets of unloading apparatus mounted upon said track-rails at each side of said house, and each comprising the supporting-frame, boom, leg and discharge-spout, means for shifting said unloading apparatus along said track-rails, means for maintaining said apparatus in rigid position upon said track-rails, and means for lowering and elevating the boom and leg; substantially as set forth.

8. The grain elevator or unloading apparatus comprising the supporting-frame, the boom hinged at its lower end upon said frame, the carriage mounted upon said boom and adapted to move lengthwise thereof, and the leg connected with said carriage and adapted to be raised and lowered therewith, said leg having a hinge-like movement, combined with means for raising and lowering the upper end of said boom so that it may be pulled inward or swung outward, and means for moving said carriage upon said boom, whereby said leg may be raised or lowered to the desired position; substantially as set forth.

9. The grain elevator or unloading apparatus comprising the supporting-frame, the boom swiveled and hinged at its lower end upon said frame so as to have an axial motion as well as a swinging motion, the carriage mounted upon said boom and adapted to travel longitudinally thereof, and the leg hinged at its upper end to said carriage, combined with means for imparting to said boom an axial motion, means for swinging said boom outward and returning it to its former position alongside of said frame, and means for moving said carriage upon said boom; substantially as set forth.

10. The grain elevator or unloading apparatus comprising the supporting-frame, the boom hinged at its lower end upon said frame, the carriage carried by said frame and adapted to travel longitudinally thereof, the leg connected in a hinged manner at its upper end to said carriage, and the discharge-spout connected with said leg, combined with means for swinging the upper end of said boom outward and back to its former position, and means for controlling the movement of said carriage; substantially as set forth.

11. The grain elevator or unloading apparatus comprising the supporting-frame, the boom hinged at its lower end upon said frame, the carriage mounted upon said boom and adapted to travel thereon, the leg hinged at its upper end to said carriage and containing the endless elevating-belt, and the discharge-spout connected with the upper portion of said leg, combined with means for controlling the movement of the said boom and said carriage, and means for operating said endless elevating-belt in the various positions said boom and leg may occupy; substantially as set forth.

12. The grain elevator or unloading apparatus comprising the supporting-frame, the boom hinged and swiveled at its lower end upon said frame, the carriage mounted upon said boom and adapted to travel lengthwise thereof, the leg hinged at its upper end to said carriage, and the discharge-spout connected with said leg, combined with means for turning said boom axially, means for turning said boom upon its hinges, means for controlling the movement of the said carriage and leg on said boom, and gearing, substantially as described, for imparting to the elevating-belt in said leg continuous motion from a driving-shaft without regard to the position said leg may assume in use; substantially as set forth.

13. The grain elevator or unloading apparatus mounted upon track-rails and comprising the supporting-frame, the hinged boom, the carriage upon said boom, the leg containing the endless traveling belt and hinged to said carriage, and the discharge-spout connected with said leg, combined with the driving-shaft $Y'$, gearing intermediate said shaft and said endless elevating-belt for operating the latter from the former, the traveling cable $a'$, and means for communicating the motion of said cable to said driving-shaft $Y'$; substantially as set forth.

14. The grain elevating or unloading apparatus mounted upon track-rails and comprising the main supporting-frame, the boom hinged at its lower end, the carriage on said boom, the leg carried by said carriage, and the discharge-spout connected with said leg, combined with the power-cable $a'$, the cables connected with said boom and said carriage for controlling the motion of the same, and mechanism intermediate said power-cable $a'$ and the cables of said boom and carriage, whereby the latter may be operated from the former; substantially as set forth.

15. The grain elevator or unloading apparatus mounted upon track-rails and comprising the main supporting-frame, the boom hinged at its lower end, the leg carried by said boom, and the discharge-spout connected with said leg, combined with means for controlling the movement of said boom and leg, the cable for moving said supporting-frame along said track-rails, and means for locking said supporting-frame in position upon said track-rails; substantially as set forth.

16. The floating elevator having along its deck the track-rails and along the side of its house the guide and stay, and the unloading apparatus mounted upon said track-rails and comprising the main supporting-frame, the boom hinged at its lower end, the carriage mounted upon said boom, the leg carried by said carriage, and the discharge-spout connected with said leg, combined with means for controlling the movement of said boom and carriage, the rollers carried by said frame and engaging said guide and stay secured to the side of the house, and means for locking said frame in rigid position with respect to said guide and stay; substantially as set forth.

17. The floating elevator, the longitudinal conveyer on the deck thereof, and the transverse conveyer leading inward from said longitudinal conveyer, combined with the unloading apparatus on the deck of the elevator and comprising the supporting-frame, boom, leg and discharge-spout, the said spout leading to said longitudinal conveyer; substantially as set forth.

18. The floating elevator, the longitudinal conveyers at the right and left hand sides thereof, the transverse conveyer leading inward toward the left-hand side of the elevator from the right-hand longitudinal conveyer, and the transverse conveyer leading inward toward the right-hand side of the elevator from the left-hand longitudinal conveyer, combined with the unloading apparatus at each side of the elevator and adapted to discharge to said longitudinal conveyers; substantially as set forth.

19. The movable grain-elevator comprising the carriage, the frame carried thereby, the boom hinged at its lower end upon said carriage, and the leg secured in a hinge-like manner to said boom, combined with means carried by said carriage for raising and lowering said boom and said leg, and the horizontal conveyer into which said leg discharges and which removes the grain; substantially as set forth.

20. The series of grain elevators or unloading apparatus each comprising the frame, the boom hinged at its lower end upon said frame, the leg secured in a hinge-like manner upon said boom, and the discharge-spout leading from the upper end of said leg, combined with means for raising and lowering said booms and legs, means for operating all or any of said unloading apparatus, and the horizontal conveyer into which the discharge-spouts of all the said apparatus may discharge and which will remove the grain; substantially as set forth.

21. The elevator having along its deck the series of movable grain-unloading apparatus comprising mechanism for elevating the grain from the various hatches of the boat or boats to be unloaded, means for simultaneously operating all or any of said apparatus, and means for shifting all or any of said apparatus in accordance with the position of the hatches of the boat or boats to be unloaded, combined with the longitudinal conveyer along and upon the deck of said elevator to receive the grain from said apparatus so as to remove the same and permit of the simultaneous and continuous operation of all of said apparatus; substantially as set forth.

22. The series of grain elevators or unloading apparatus each comprising the frame, the boom hinged thereto, the leg secured in a hinge-like manner to said boom, and means for raising and lowering said boom and leg, combined with means for simultaneously operating all or any of said apparatus, the horizontal conveyer to receive the grain from all of said apparatus, and a further horizontal conveyer to receive the grain from the first-named conveyer; substantially as set forth.

Signed at New York, in the county of New York and State of New York, this 17th day of February, A. D. 1899.

GEORGE B. MALLORY.

Witnesses:
CHAS. C. GILL,
E. JOS. BELKNAP.